PHOTOCELL CONSTRUCTION HAVING TRANSPARENT SUBSTRATE UPON WHICH PHOTOCELL IS DISPOSED AND HEAT SINK

Filed March 9, 1965

INVENTOR

WALTER HEIMANN
HANS R. MAUS
ERICH A WOLF

BY Otto John Munz,
ATTORNEY 3,449,580
PHOTOCELL CONSTRUCTION HAVING TRANSPARENT SUBSTRATE UPON WHICH PHOTOCELL IS DISPOSED AND HEAT SINK Walter Heimann and Hans R. Maus, Wiesbaden-Dotzheim, and Erich A. Wolf, Wiesbaden, Germany, assignors to Forschungslaboratorium Prof. Dr.-Ing. Walter Heimann, am Kohlheck, Wiesbaden-Dotzheim, Germany Filed Mar. 9, 1965, Ser. No. 438,341
Claims priority, application Germany, Mar. 14, 1964, F 42,318
Int. Cl. H01j *39/12;* G01t *1/16*
U.S. Cl. 250—211 5 Claims

ABSTRACT OF THE DISCLOSURE

A photocell having a thin photoconductive film supported by a transparent substrate and cooled by a heat sink. The transparent substrate is mounted on the heat sink by means of a cement of high thermal conductivity and low electrical conductivity which is adhered to the heat sink and the side of the transparentsubstrate bearing the photoconductive film, and is in a thin enough layer to provide good heat conduction from the photoconductive film to the heat sink.

*Background of the invention*

The present invention pertains to a high-capacity photoresistance cell.

When considering the technical possibilities for using a photo resistance, not only the photo-electric data and properties, but also the admissable limiting values for the operating conditions thereof play a decisive part. Particularly the maximum electric power loss which may be tolerably transformed at the photo resistance is of determinative significance. As a rule, it is desirable that this limiting value be as large as possible because as a result of the increasing magnitude of the admissible power loss, the required expenditure of other switching members or elements is generally reduced.

The electric power loss in a given photoresistance must not exceed a specific limiting value. The reason for this is that the light-sensitive substance, including the electrodes, must not be heated beyond a specific temperature. The temperature which is adopted by the light-sensitive substance during the operation of the photoresistance depends upon the electric power or output which is transformed and on the speed with which the heat that is produced can be deflected or dissipated therefrom.

Therefore, in the construction of a photo resistance the problem of assuring as good a dissipation of heat as possible must also be solved. This problem involves difficulties since the light-sensitive substance is very sensitive to contact with other materials, as is well known. Moreover, an electric short circuit which might be produced due to the contact with a heat-dissipating means, for example, a metal plate, must be avoided.

In the prior art two different types of constructions which have the object of dissipating, by way of a metal, the heat developed in the light-sensitive layer are already known.

In one instance, a metal block is used as a carrier for the light-sensitive layer and the necessary electric insulation is produced by preliminary conversion of the metal surface to an insulating layer, as taught, for example, in the I.B.M. Technical Disclosure Bulletin, Vol. 4, No. 8, January 1962, entitled High Thermal Conductance Substrate.

In the other instance, the carrier plate supporting the photoresistance proper is connected with a metallic cooling plate by means of an adhesive layer.

These arrangements, however, have the following disadvantages.

It is well known that the photoelectric properties of a photoconductive substance depend upon the structure thereof, i.e. upon the crystal form, the particle size (in polycrystalline material), and upon the properties thereof. If a material suitable for the photo conduction is applied to a carrier in the manner of known methods, for example, by evaporating or spraying on, a subsequent treatment of the substance which has been applied must, as a rule, be carried out in order to produce the required crystalline structure and properties. If the layer destined for photo conduction is connected with the metal body fom the very beginning, the preparation of the light-sensitive material causes difficulties with respect to manufacturing techniques which at least restrict the applicability of either one of the two methods. It is well known that the photoelectric properties of a photo-conductive material are markedly altered by the addition of already the smallest amounts of other substances, particularly of metals. The presence of the metal carrier during the preparation may, therefore, result in an uncontrollable influence on the photo-electric layer. Furthermore, there exists the danger that the metal carrier is chemically attacked in an undesirable manner, or even destroyed, by the treatment which is intended for the layer. The technical realization of such photoresistances appears, therefore, to be problematic.

On the otherhand, while the afore-mentioned difficulties will not exist when a finished photoresistance plate is connected with a cooling plate by gluing—as is the case in the second known method—the following disadvantage with regard to the dissipation of heat will arise instead: The carrier plate supporting the photoresistance plate is glued with the reverse side thereof to the cooling plate so that the front side of the photoresistance plate which is provided with the electrodes is kept free for the incidence of the light. The conductivity produced in the photoresistance plate by the impinging light is naturally strongest at the surface of the photoresistance plate and decreases in the direction toward the cooling plate. If an electric voltage is applied to the electrodes of the photoresistance, a current density is formed as a result of the afore-mentioned distribution of the conductivity which will decrease in the direction toward the cooling plate. This distribution of the current density is additionally promoted by virtue of the fact that the electrodes are disposed at the side of the resistance plate which faces away from the cooling plate. The heat which is formed due to the pasage of current is thus produced predominantly in proximity to the surface, in other words, at the side of the photoresistance plate facing away from the cooling plate. The substance of the carrier or supporting plate itself thus impedes the dissipation of heat by way of the cooling plate. This disadvantage can also not be overcome, in this known construction, by making the resistance plate very thin, since a minimum thickness is required just to preserve the mechanical stability of the resistance plate and it exceeds by far the depth of penetration of the light and thus the thickness of the current-carrying layer. Conventional photoresistance plates have a thickness in the order of one millimeter. The depth of penetration of the light amounts to only a fraction of what is recognizable, for example, in the much-used CdS (cadmium sulphide), which is sensitive in the visible spectral region, apparently due to the complete orpaqueness of the photoresistance plate.

*Summary of the invention*

It is the primary object of the present invention to effectively eliminate the afore-described disadvantages and drawbacks of the prior art.

Another object of the present invention is to eliminate the problems of heat dissipation and to improve and simplify the performance of photoresistances.

Still another object of the invention is to provide a photocell composed of a photoresistance unit having a light-transmissive plate coated with a very thin layer of a light-sensitive susbtance provided on its surface with electrodes, and of a highly heat-conductive unit having a heat capacity greater than that of the light-sensitive substance, the two units joined with a cementing material in such a manner that the light sensitive substance faces the heat conductive unit.

These and other objects of the invention, many of its attendant advantages and various novel features thereof will be apparent from the following description and from the accompanying drawings disclosing a preferred embodiment of the invention.

*Brief description of the drawing*

In the drawings wherein like reference characters describe the same or equivalent parts.

*Description of the preferred embodiments*

Figure 1:
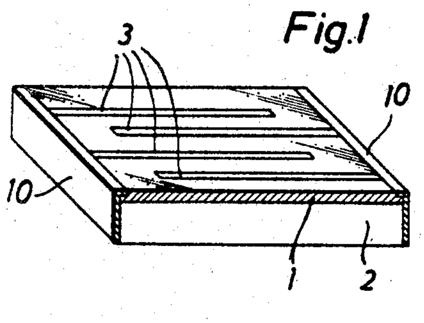
FIG. 1 is a perspective view of a photoresistance unit.
Figure 2:
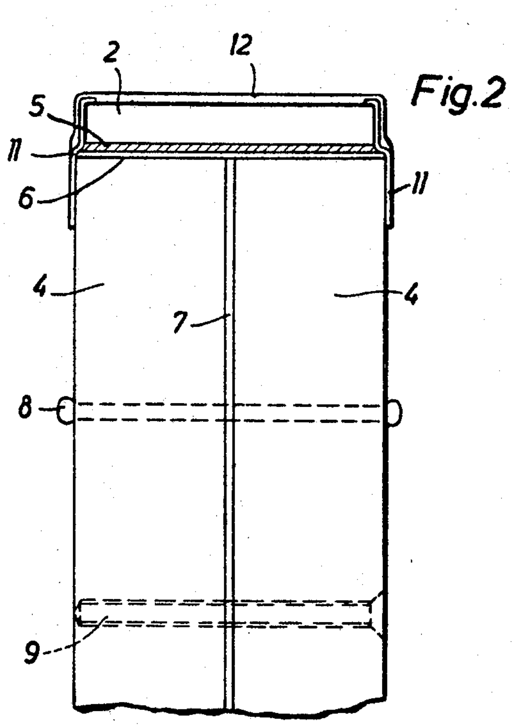
FIG. 2 is a cross sectional view of a photoresistance cell including the parts shown in FIG. 1.

The photoresistance unit is shown in FIG. 1 and in the upper portion of FIG. 2 with the transparent substrate 2 provided with photoconductive film or coating 1, with electrodes 3 on its surface.

Figure 3:
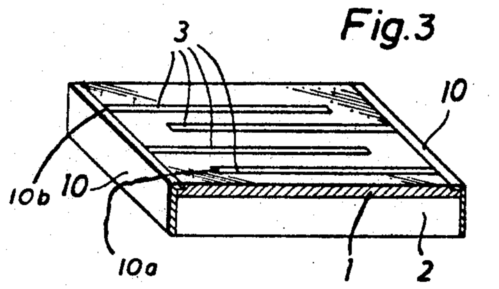
FIG. 3 is a perspective view same as that of FIG. 1, showing in addition electrical conduits to the electrodes.

A heat-conductive unit or heat sink 4 may be employed in two alternative embodiments; in one embodiment, shown in FIG. 2, as a two rod unit having 2 conductive bodies 4 separated by an insulator 7, whereby each rod simultaneously may serve as a conduit to one electrode 10 of the transparent substrate 2. In another embodiment, shown in FIG. 4, the heat-conductive unit or heat sink 4 is made as a single body and the electrodes are directly connected by wires to the current supply at 10, as shown in FIG. 3.

The starting point therein is the photoresistance which is constructed in the following manner.

The light-sensitive substance, in the form of a thin photoconductive film or layer 1, is applied to a mechanically stable, electrically-insulating and light-transmissive base, for example a glass plate 2. The thickness of the layer is in the order of $10\mu$. The supply of current is effected by means of an electrode system 3 which is disposed at the surface of the light-sensitive substance. The manufacture of this photoresistance does not present any problems with respect to the manufacturing techniques employed in the prior art.

According to the present invention, the photoresistance plate is cemented onto a highly heat-conductive body 4, preferably metal, which has a heat capacity greater than that of the light-sensitive substance 1. The resistance layer 5 faces the metal base. Used as cement or adhesive material 6 is, for example, a conventional casting resin, such as styrene, isobutylene, vinyl chloride, vinylidene chloride, vinyl ketones, vinyl ethers, acrylonitriles, acrylic and methacrylic acids, acrylates, methacrylates, polymers, polystyrenes, chlorides, ethylenes, polyethylenes and the like, whose heat conductivity is increased, with respect to the heat conductivity of a pure casting resin, by the admixture thereto of large amounts of a material which increases heat conductivity, such as aluminum oxide powder or quartz powder. The photoresistance is cemented on in such a manner that as thin a layer of cement as possible is present between the metal and the light-sensitive substance whose thickness suffices, however, to assure the necessary electrical insulation. It is also possible to apply a thin plastic foil between the resistance plate and the metal base in order to assure the electrical insulation in a simpler manner with a view toward problems concerning the manufacturing technique.

Since the glass plate upon which the light-sensitive layer is applied is, in the present case, light-transmissive, and since the resistance layer has a small thickness which is comparable to the depth of penetration of the light, the electrical properties of the resistance layer are influenced, at the incidence of light, by the glass plate in virtually the same manner as if the resistance layer were illuminated from the front thereof in a conventional manner.

The current which flows in the resistance layer under the influence of an electric voltage applied from the outside will be distributed over the entire volume of the light-sensitive substance because of the small thickness of the resistance layer, but will flow preferably on the side facing the metal carrier because the electrodes are provided thereon.

The problem of the heat dissipation has thus been solved in an optimum manner because only the electrically-insulating intermediate layer is positioned between the place of greatest formation of heat and the heat-dissipating metal.

Because of the limited depth of penetration of the light, such an effect may be achieved only if a very thin light-sensitive layer is employed. Such a layer may be provided in a technically flawless manner by applying the substance initially to a light-transmissive carrier compatible with the material and by thereupon preparing it there according to conventional methods. The subsequent cementing of the photoresistance also prepared according to a conventional method so that the layer is not adversely affected by the connection with the metal carrier which serves for the dissipation of heat, presents no problem to the present state of the art.

In the embodiment described herein, the metal base to which the photoresistance is cemented consists of two metal rods. The two parts of this base are cemented upon each other in the longitudinal direction with the interposition of an insulating material 7 so that the two metal parts and the insulating layer will constitute an integral structural element. The two metal rods which are combined into one rod, by being glued together in the manner described above may also be held together by other means, for example by rivets 8 or screws 9 of insulating material (FIG. 2).

Since the metal carrier for the resistance plate consists of two parts which are electrically insulated against each other, it may itself be employed as the current supply for the resistance plate. For this purpose, it is additionally necessary only to connect the electrode pick-ups 10 (FIG. 1) with the metal carrier which may be effected, for example, by means of metal clamps 11 to be secured to the metal carrier in a conventional manner (FIG. 2). The connection between the metal clamp and the electrode pick-up may be established by soldering, or by a simple clamping contact. In order to improve the mechanical sturdiness and, if desired, the electric insulation, the photoresistance cemented to the metal carrier may be covered by a light-transmissive plastic material 12 which is devoid of any heat-conduction-improving filler materials.

The above described construction applies to a specific case which may, however, be largely generalized whereby the principle of the construction is maintained.

In accordance with the present invention, in a modified construction thereof, the metal base may simply be made of a uniform metal piece without separating insulation. The electric supply lines to the photoresistance plates, in that case, are two wires separately connected to the plate. This is shown in detail in FIGS. 3 and 4.

The metal base need not necessarily have the shape of a rod but may instead be a metal plate or also a metal tube with the supply line wires extending through the inside thereof.

Figure 4:
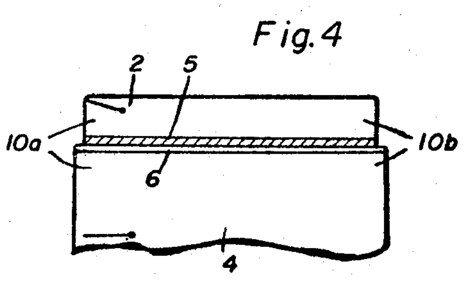
FIG. 4 is a perspective view of a photoresistance cell of a different embodiment.

In FIG. 4 a combination of the photoresistance with the heat conductive body is shown glued together as one monolithic unitary structure. In this instance no clamps 11 are required. The glue preferably used for this purpose is a conventional casting resin, such as styrene, isobutylene, vinyl chloride, vinylidene chloride, vinyl ketones, vinyl ether, acrylonitriles, acrylic and methacrylic acids, accrylates, methacrylates, polymers, polystyrenes, chlorides, ethylenes, polyethylenes and the like.

The plate 2 is made of a glass or an equivalent resin having the optimum possible light transmission properties, such as methyl, methacrylate or polystyrene.

Because of the excellent heat dissipation from the resistance layer, the temperature which is adopted by the resistance layer at a specific electric output which is transformed therein, will be lower than if the light-sensitive substance according to other corresponding constructions has a less favorable heat contact with respect to the cooler environment. The admissible electric power loss is correspondingly greater so that the technical applicability of a photoresistance having the structural features outlined hereinabove is more versatile as compared to other known systems.

While we have disclosed the form of mechanism presently preferred by us for carrying the invention into practice, numerious modifications, alternations and substitutions of equivalents will occur to those skilled in the art, after a study of the foregoing specification. Hence the disclosure should be taken in an illustrative rather than a limiting sense; and it is our desire and intention to reserve all modifications and substitutions of equivalents within the scope of the subjoined claims.

Having now fully disclosed the invention, what we claim and desire to secure by Letters Patent is:

1. A photocell, comprising:

heat sink means;

transparent substrate means;

photoconductive film means deposited upon by said transparent substrate means;

electrode means for connecting said photoconductive film means in an electrical circuit; and adhesive materials of high thermal conductivity and low electrical conductivity disposed between said heat sink means and the face of said transparent substrate means which bears said photoconductive film means in heat transferring relationship with both said photoconductive film means and said heat sink means.

2. A photocell as claimed in claim 1 in which said adhesive material comprises a casting resin mixed with heat conducting powdered materials selected from the group consisting of aluminum oxide and quartz.

3. A photocell as claimed in claim 2 further comprising clamping means joining said heat sink means, said transparent substrate means, and said adhesive material together.

4. A photocell as claimed in claim 2 including a heat insulating transparent plastic sheet covering said photoconductive film means and clamping means secured to said heat sink means and said plastic sheet and joining the component parts of said photocell into an integral body.

5. A photocell as claimed in claim 1 in which said heat sink means comprises two electrically conductive rods, insulated from each other, and each connected to one of said electrode means.

References Cited

UNITED STATES PATENTS

| | | | |
|---|---|---|---|
| 3,054,977 | 9/1962 | Baasch | 338—18 |
| 3,227,885 | 1/1966 | Hirai et al. | 250—238 |

OTHER REFERENCES

"High Thermal Conductance Substrate," by Engel, IBM Technical Disclosure Bulletin, Vol. 4, No. 8, January 1962.

RALPH G. NILSON, *Primary Examiner.*

MARTIN ABRAMSON, *Assistant Examiner.*

U.S. Cl. X.R.

250—83, 238